Figures 1, 2:
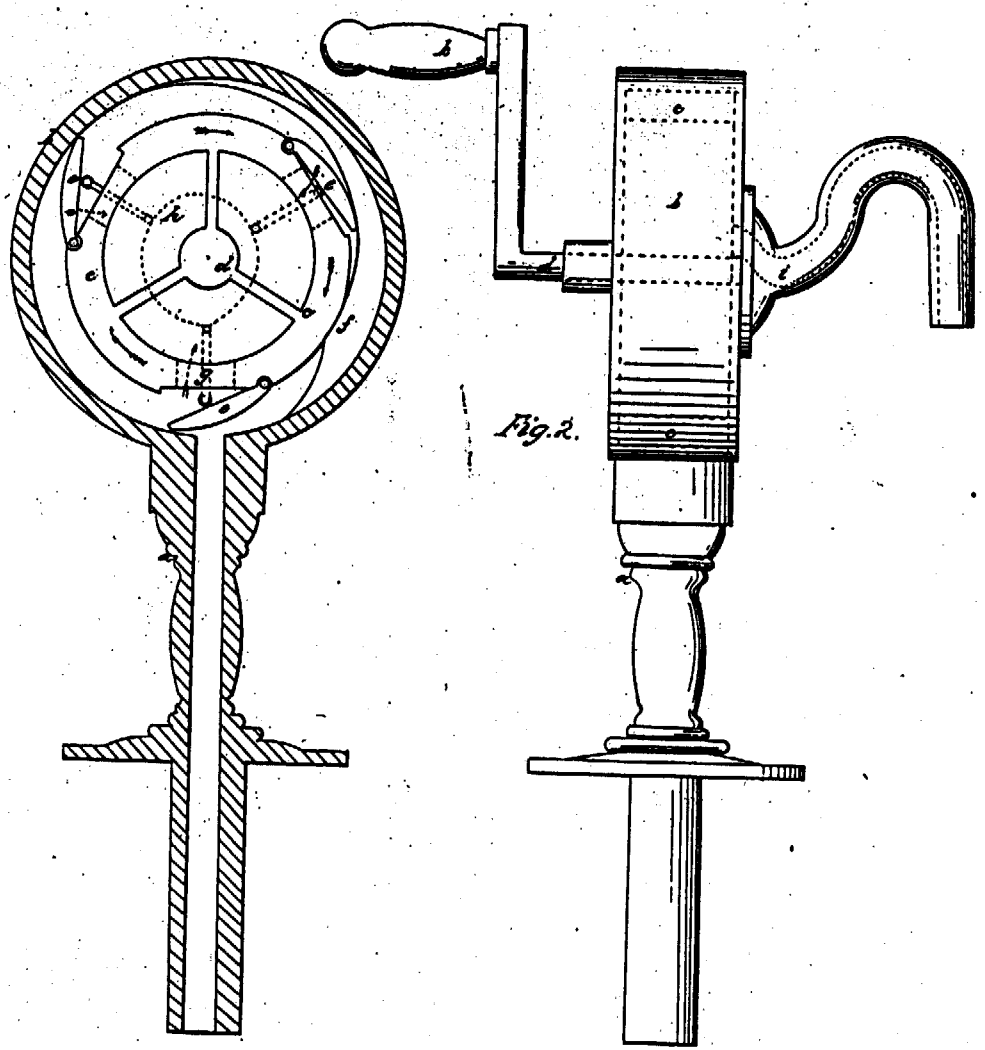

9220½X

Peters & Dean,

Rotary Pump,

Patented Oct. 31, 1835.

G.F.PETERS PHOTO-LITHOGRAPHER, WASHINGTON, D.C.

9220½ X Oct. 31. 1835

Charles Peters and Benjamin Dean of Poughkeepsie N.Y.

Letters Patent

The Schedule referred to in these Letters Patent and making part of the same
containing a description in the words of the said Charles Peters & Benjamin
Dean themselves of their improvement in the Rotary Pump To all to whom these presents shall come. Know Ye that We,
Charles Peters and Benjamin Dean of the Village of Poughkeepsie in
Dutchess County and State of New York. have jointly invented and
brought into use certain new and useful improvements in the constru
tion of a Rotary Pump. by which the lifting and forcing of water or othe
liquids may be effected separately or conjointly. by a continuous Rotary
motion with more ease; with the same power and greater abund.
than hath been heretofore done; and that the said improvements and the
methods of effecting, applying. and using the same. are set forth and
shewn in the following description. and in the drawings annexed
to and making part of this Specification. in such full, clear and exact,
terms as to distinguish the same from all other improvements before kno
Wherein Figure 1. represents a vertical Projection of one side of the
circle or shell of the pump: with its wheel, valves, pipe. and other par
in skeleton the covering plate on that side being removed to exhibit the
interior parts. Figure 2. represents a vertical cross section o
the same. with also induction, and eduction pipes. the crank and -
spindle or arbor: The Letters of reference apply to the similar par
in both figures, Number 1. and number 2. A.A. is the standar
pipe which may be connected at the foot in any convenient manner
with another pipe by being soldered or screwed on or by any other mean
this last mentioned pipe leads to the liquid in the well, tank, cister
Cask or other vessel: b.b. is a cylindrical box having two flat -
sides secured in any convenient manner, to the edge of the ring within
this box is the Rotary cylinder. C. having an exterior ring and three -
arms. and working in an arbor or spindle D. and having the two flat
external sides carefully fitted to work close to the side plates of the box

[illegible] 9220 1/2X in the periphery of the cylinder C. are hinged valves e.e.e. which are
to be shut down by the slide curve f. as the valves pass along or under
it and the valves are to be again opened out by the operation of sliding
levers g.g.g. shown in figure 1. by dotted lines. These levers at the
inner end pass over and are regulated by the cam h. also shown by
dotted lines as fixed on the lower plate on that side, and having
room in a countersunk space in the cylinder C. to lie into. The levers g.g.
g. have each a small roller fitted into each of their ends by a mortice to
revolve on pins. and are fixed in, near one side of the cylinder C. Im-
mediately under the valves e.e.e. are openings shown by dotted lines
and cut as large as the material will allow. into the spaces between the
arms and ring of the rotary cylinder C. and in the cover plate on that
side is an opening into the eduction pipe i whose domed flanch cov-
ers that end of the spindle d. and also the eduction opening.
When the machine is to be used. the handle K. is to be turned so
as to propel the cylinder C. and valves e.e.e. in the direction of the
arrows. by these parts being fitted closely the air will be drawn out
of the pipe a. and the fluid below will rise therein and go under
each valve in succession through the openings and into the interior of
the cylinder C. in the course shown by the dotted arrows. whence by
the continuance of the operation: the fluid will be driven out through
the eduction pipe i. Figure 2. This machine may be made of any
convenient metal according to the size required and the description
of fluid matter it is intended to operate on. bell metal is best for
general use: The induction and eduction and eduction pipes
must be in proportion to the size and strength of the circle or shell
and wheel of the pump and these should be in proportion to the quan-
tity of liquor intended to be raised and delivered in a given space of
time and the power to be applied should be in proportion to the whole.
The number of valves should not exceed four nor be less than two.
three has been found the most convenient and useful number.
The body or shell of the pump may be from 3 inches in diameter
to any desirable size. according to the use for which the pump is designed.

9220 1/2X

When the shell or [illegible] of the pump is very large. the other parts mus[t]
of course conform in size and strength. This pump may be made of
a size and strength sufficient to deliver a very large column of wate[r]
ten much larger than from common pumps.
We do not claim as our invention any of the parts of the above de-
scribed pump separately. but we claim as our invention & improve-
ment the openings of the holes in the wheel leading to and from its
centre for the passage of the liquid and so combining them with the
valves which cover them: and with the other parts of said pump ad-
justed and placed in manner aforesaid as to take all the water
which comes into the pump to the centre of the wheel and thence
deliver it. This plan of taking the liquid to the centre of the whe[el]
and thence delivering it as well as the mode of effecting that ob-
ject we believe to be new and we have found it very useful.
A pump constructed upon our aforesaid plan is much more simple
much easier kept in repair and much more powerful and works
much easier than the common Rotary pump. By fixing a proper pip[e]
to the spout and closing the ordinary aperture at which the water or li-
quid is delivered, it may be forced into any room in the house or
to almost any height. As witness our hands.

Witnesses
John G. Staples
Chas. A. Sherman

Charles Peters
Benjamin Dean (1190 words)

(Patented October 31. 1835)

(Drawing)